(12) United States Patent
Fay

(10) Patent No.: US 8,272,445 B2
(45) Date of Patent: Sep. 25, 2012

(54) TUBULAR VALVE SYSTEM AND METHOD

(75) Inventor: Peter J. Fay, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 192 days.

(21) Appl. No.: 12/503,236

(22) Filed: Jul. 15, 2009

(65) Prior Publication Data

US 2011/0011597 A1 Jan. 20, 2011

(51) Int. Cl.
*E21B 34/10* (2006.01)

(52) U.S. Cl. .... 166/373; 166/386; 166/331; 137/625.48

(58) Field of Classification Search ............... 166/386, 166/373, 331, 332.1, 321; 137/625.28, 625.33, 137/625.48, 497, 504
See application file for complete search history.

(56) References Cited

U.S. PATENT DOCUMENTS

| | | |
|---|---|---|
| 1,883,071 A | 12/1928 | Stone |
| 2,769,454 A | 11/1956 | Bletcher et al. |
| 2,812,717 A | 11/1957 | Brown |
| 2,822,757 A | 2/1958 | Colberly |
| 2,973,006 A | 2/1961 | Nelson |
| 3,007,527 A | 11/1961 | Nelson |
| 3,013,612 A | 12/1961 | Angel |
| 3,148,731 A | 9/1964 | Holden |
| 3,211,232 A | 10/1965 | Grimmer |
| 3,263,752 A | 8/1966 | Conrad |
| 3,358,771 A * | 12/1967 | Berryman ............ 166/331 |
| 3,510,103 A | 5/1970 | Carsello |
| 3,566,964 A | 3/1971 | Livingston |
| 3,667,505 A | 6/1972 | Radig |
| 3,703,104 A | 11/1972 | Tamplen |
| 3,727,635 A | 4/1973 | Todd |
| 3,797,255 A | 3/1974 | Kammerer, Jr. et al. |
| 3,901,315 A | 8/1975 | Parker et al. |
| 3,954,138 A | 5/1976 | Miffre |
| 3,997,003 A | 12/1976 | Adkins |
| 4,067,358 A | 1/1978 | Streich |
| 4,160,478 A | 7/1979 | Calhoun et al. |
| 4,176,717 A | 12/1979 | Hix |
| 4,190,239 A | 2/1980 | Schwankhart |
| 4,246,968 A | 1/1981 | Jessup et al. |

(Continued)

FOREIGN PATENT DOCUMENTS

EP 0427422 A2 5/1991

(Continued)

OTHER PUBLICATIONS

Notification of Transmittal of the International Search Report and the Written Opinion of the International Searching Authority; PCT/US2010/044856; Mailed Apr. 15, 2011.

(Continued)

*Primary Examiner* — Nicole Coy

(74) *Attorney, Agent, or Firm* — Cantor Colburn LLP

(57) ABSTRACT

A tubular valve system including a tubular having a plurality of ports therethrough; a plurality of strokable sleeves disposed at the tubular being configured to stroke in response to a same external input; and a plurality of motion translating details disposed at at least one of the tubular and the plurality of strokable sleeves configured to alter a stroke of the plurality of strokable sleeves after a selected number of strokes to thereby open at least one of the plurality of ports and method.

24 Claims, 4 Drawing Sheets

U.S. PATENT DOCUMENTS

| | | | |
|---|---|---|---|
| 4,260,017 A | 4/1981 | Nelson et al. | |
| 4,291,722 A | 9/1981 | Churchman | |
| 4,292,988 A | 10/1981 | Montgomery | |
| 4,355,685 A | 10/1982 | Beck | |
| 4,390,065 A | 6/1983 | Richardson | |
| 4,448,216 A | 5/1984 | Speegle et al. | |
| 4,478,279 A | 10/1984 | Puntar et al. | |
| 4,537,383 A | 8/1985 | Fredd | |
| 4,554,981 A | 11/1985 | Davies | |
| 4,566,541 A | 1/1986 | Moussy et al. | |
| 4,576,234 A | 3/1986 | Upchurch | |
| 4,583,593 A | 4/1986 | Zunkel et al. | |
| 4,669,538 A | 6/1987 | Szarka | |
| 4,711,326 A | 12/1987 | Baugh et al. | |
| 4,714,116 A | 12/1987 | Brunner | |
| 4,729,432 A | 3/1988 | Helms | |
| 4,823,882 A | 4/1989 | Stokley et al. | |
| 4,826,135 A | 5/1989 | Mielke | |
| 4,856,591 A | 8/1989 | Donovan et al. | |
| 4,893,678 A | 1/1990 | Stokley et al. | |
| 4,944,379 A | 7/1990 | Haaser | |
| 4,979,561 A | 12/1990 | Szarka | |
| 5,029,643 A | 7/1991 | Winslow et al. | |
| 5,056,599 A | 10/1991 | Comeaux et al. | |
| 5,230,390 A | 7/1993 | Zastresek et al. | |
| 5,244,044 A | 9/1993 | Henderson | |
| 5,297,580 A | 3/1994 | Thurman | |
| 5,305,837 A | 4/1994 | Johns et al. | |
| 5,335,727 A | 8/1994 | Cornette et al. | |
| 5,343,946 A | 9/1994 | Morrill | |
| 5,529,126 A | 6/1996 | Edwards | |
| 5,609,178 A * | 3/1997 | Hennig et al. | 137/10 |
| 5,704,393 A | 1/1998 | Connell et al. | |
| 5,762,142 A | 6/1998 | Connell et al. | |
| 5,775,421 A | 7/1998 | Duhon et al. | |
| 5,775,428 A | 7/1998 | Davis et al. | |
| 5,813,483 A | 9/1998 | Latham et al. | |
| 5,960,881 A | 10/1999 | Allamon et al. | |
| 6,050,340 A | 4/2000 | Scott | |
| 6,053,250 A | 4/2000 | Echols | |
| 6,079,496 A | 6/2000 | Hirth | |
| 6,102,060 A | 8/2000 | Howlett et al. | |
| 6,155,350 A | 12/2000 | Melenyzer | |
| 6,173,795 B1 | 1/2001 | McGarian et al. | |
| 6,220,350 B1 | 4/2001 | Brothers et al. | |
| 6,227,298 B1 | 5/2001 | Patel | |
| 6,253,861 B1 | 7/2001 | Carmichael et al. | |
| 6,293,517 B1 | 9/2001 | Cunningham | |
| 6,378,609 B1 | 4/2002 | Oneal et al. | |
| 6,474,412 B2 | 11/2002 | Hamilton et al. | |
| 6,530,574 B1 | 3/2003 | Bailey et al. | |
| 6,547,007 B2 | 4/2003 | Szarka et al. | |
| 6,634,428 B2 | 10/2003 | Krauss et al. | |
| 6,644,412 B2 * | 11/2003 | Bode et al. | 166/373 |
| 6,666,273 B2 | 12/2003 | Laurel | |
| 6,668,933 B2 | 12/2003 | Kent | |
| 6,681,860 B1 | 1/2004 | Yokley et al. | |
| 6,712,145 B2 | 3/2004 | Allamon | |
| 6,712,415 B1 | 3/2004 | Darbishire et al. | |
| 6,834,726 B2 | 12/2004 | Giroux et al. | |
| 6,866,100 B2 | 3/2005 | Gudmestad et al. | |
| 6,896,049 B2 | 5/2005 | Moyes | |
| 6,948,561 B2 | 9/2005 | Myron et al. | |
| 6,983,795 B2 | 1/2006 | Zuklic et al. | |
| 7,150,326 B2 | 12/2006 | Bishop et al. | |
| 7,322,408 B2 | 1/2008 | Howlett | |
| 7,325,617 B2 | 2/2008 | Murray | |
| 7,337,847 B2 * | 3/2008 | McGarian et al. | 166/334.4 |
| 7,350,578 B2 | 4/2008 | Szarka et al. | |
| 7,377,321 B2 | 5/2008 | Rytlewski | |
| 7,387,165 B2 | 6/2008 | Lopez de Cardenas et al. | |
| 7,416,029 B2 | 8/2008 | Telfer et al. | |
| 7,467,664 B2 * | 12/2008 | Cochran et al. | 166/386 |
| 7,503,390 B2 | 3/2009 | Gomez | |
| 7,503,392 B2 | 3/2009 | King et al. | |
| 7,520,336 B2 | 4/2009 | Mondelli et al. | |
| 7,730,953 B2 * | 6/2010 | Casciaro | 166/321 |
| 7,832,472 B2 | 11/2010 | Themig | |
| 2001/0007284 A1 | 7/2001 | French et al. | |
| 2004/0007365 A1 | 1/2004 | Hill et al. | |
| 2005/0061372 A1 | 3/2005 | McGrath et al. | |
| 2005/0072572 A1 | 4/2005 | Churchill | |
| 2005/0126638 A1 | 6/2005 | Gilbert | |
| 2005/0205264 A1 | 9/2005 | Starr et al. | |
| 2006/0124310 A1 | 6/2006 | Lopez de Cardenas et al. | |
| 2006/0169463 A1 | 8/2006 | Howlett | |
| 2006/0175092 A1 | 8/2006 | Mashburn | |
| 2006/0213670 A1 | 9/2006 | Bishop et al. | |
| 2006/0243455 A1 | 11/2006 | Telfer et al. | |
| 2007/0007007 A1 | 1/2007 | Themig et al. | |
| 2007/0012438 A1 | 1/2007 | Hassel-Sorensen | |
| 2007/0023087 A1 | 2/2007 | Krebs et al. | |
| 2007/0095538 A1 | 5/2007 | Szarka et al. | |
| 2007/0272413 A1 | 11/2007 | Rytlewski et al. | |
| 2008/0066924 A1 | 3/2008 | Xu | |
| 2008/0093080 A1 | 4/2008 | Palmer et al. | |
| 2008/0190620 A1 | 8/2008 | Posevina et al. | |
| 2008/0217025 A1 | 9/2008 | Ruddock et al. | |
| 2008/0308282 A1 | 12/2008 | Standridge et al. | |
| 2009/0032255 A1 | 2/2009 | Surjaatmadja et al. | |
| 2009/0044946 A1 | 2/2009 | Schasteen et al. | |
| 2009/0044955 A1 | 2/2009 | King et al. | |
| 2009/0056934 A1 | 3/2009 | Xu | |
| 2009/0056952 A1 | 3/2009 | Churchill | |
| 2009/0107680 A1 | 4/2009 | Surjaatmadja | |
| 2009/0159289 A1 | 6/2009 | Avant et al. | |
| 2009/0308588 A1 | 12/2009 | Howell et al. | |
| 2010/0294514 A1 | 11/2010 | Crow et al. | |
| 2011/0108284 A1 | 5/2011 | Flores et al. | |
| 2011/0180274 A1 | 7/2011 | Wang et al. | |

FOREIGN PATENT DOCUMENTS

| | | |
|---|---|---|
| GB | 2281924 | 3/1995 |
| WO | 00/15943 | 3/2000 |

OTHER PUBLICATIONS

Notification of Transmittal of the International Search Report and the Written Opinion of the International Searching Authority; PCT/US2010/044383; Mailed Apr. 15, 2011.

International Search Report and Written Opinion of the International Searching Authority; PCT/US2010/044378; Mailed Mar. 17, 2011.

International Search Report; PCT/US2010/033737; Korean Intellectual Property Office; Mailed Jan. 24, 2011.

International Search Report; Date of Mailing Jan. 24, 2011; International Appln No. PCT/US2010/034736; 3 Pages.

International Search Report; Date of Mailing Jan. 24, 2011; Internatiaonal Appln. No. PCT/US2010/034752; 3 Pages.

International Search Report and Written Opinion; Date of Mailing Feb. 11, 2011; International Appln No. PCT/US2010/041049; International Search Report 5 Pages and Written Opinion 3 Pages.

Schlumberger, TAP Completion System, Multizone completions in a single continuous operation, Dec. 2007, Schlumberger, pp. 1-4.

Petrowell, FRID & Intelligent Products, RFID Keystone Module, http://www.petrowell.co.uk/, p. 1.

Response to Office Action dated Oct. 15, 2008, in U.S. Appl. No. 11/891,713, U.S. Patent and Trademark Office, U.S.A.

Office Action dated Jun. 25, 2009, in U.S. Appl. No. 11/891,714, USPTO, U.S.A.

Office Action dated Jun. 19, 2009, in U.S. Appl. No. 11/891,715, U.S. Patent and Trademark Office, U.S.A.

Response to Restriction Requirement dated Apr. 22, 2009 in U.S. Appl. No. 11/891,715, U.S. Patent and Trademark Office, U.S.A.

Office Action dated Apr. 9, 2009, in U.S. Appl. No. 11/891,715, U.S. Patent and Trademark Office, U.S.A.

Notice of Allowance & Fees Due and Notice of Allowability dated Jan. 5, 2009, in U.S. Appl. No. 11/891,713, U.S. Patent and Trademark Office, U.S.A.

Office Action dated Jul. 16, 2008 in U.S. Appl. No. 11/891,713 U.S. Patent and Trademark Office, U.S.A.

International Search Report, Feb. 11, 2009 pp. 1-3, PCT/US2008/072732, Korean Intellectual Property Office.

Notification of Transmittal of the International Search Report and the Written Opinion of the International Searching Authority, or the Declaration, Feb. 11, 2009, pp. 1-4, PCT/US2008/072732, Korean Intellectual Property Office.

Notification of Transmittal of the International Search Report and the Written Opinion of the International Searching Authority, or the Declaration, Feb. 11, 2009, pp. 1-4, PCT/US2008/072734, Korean Intellectual Property Office.

Written Opinion of the International Searching Authority, Feb. 11, 2009, pp. 1-3, PCT/US2008/072732, Korean Intellectual Property Office.

Written Opinion of the International Searching Authority, Feb. 11, 2009, pp. 1-4, PCT/US2008/072734, Korean Intellectual Property Office.

International Search Report, Feb. 11, 2009, pp. 1-3, PCT/US2008/072734, Korean Intellectual Property Office.

International Search Report, Feb. 11, 2009, pp. 1-3, PCT/US2008/072735, Korean Intellectual Property Office.

Notification of Transmittal of the International Search Report and the Written Opinion of the International Searching Authority, or the Declaration, Feb. 11, 2009, pp. 1-4, PCT/US2008/072735, Korean Intellectual Property Office.

Notification of Transmittal of the International Search Report and the Written Opinion of the International Searching Authority, or the Declaration, Jan. 19, 2009, pp. 1-4, PCT/US2008/072470, Korean Intellectual Property Office.

Written Opinion of the International Searching Authority, Feb. 11, 2009, pp. 1-4, PCT/US2008/072735, Korean Intellectual Property Office.

Written Opinion of the International Searching Authority, Jan. 19, 2009, pp. 1-3, PCT/US2008/072470, Korean Intellectual Property Office.

International Search Report, Jan. 19, 2009, pp. 1-3, PCT/US2008/072470, Korean Intellectual Property Office.

Baker Hughes, Baker Oil Tools, Conventional Fishing Technical Unit; Pump Out Sub Product Family No. H14061, Jun. 7, 2005, 1 page.

Ross, C. M., et al., "Current Materials and Devices for Control of Fluid Loss," SPE 54323, Apr. 1999, pp. 1-16.

Hoffman, C.R., "One-Trip Sand-Control/Liner Hangar/ Big-Bore Completion System," SPE 101086, Sep. 2006, pp. 1-10.

G.L. Rytlewski, A Study of Fracture Initiation Pressures in Cemented Cased-Hole Wells Without Perforations, May 15, 2006, pp. 1-10, SPE 100572, Society of Petroleum Engineers, U.S.A.

Boscan, J., et al., "Successful Well Testing Operations in High-Pressure/High-Temperature Encironment; Case Histories," SPE 84096, Oct. 2003, pp. 1-15.

Brad Musgrove, Multi-Layer Fracturing Solution Treat and Produce Completions, Nov. 12, 2007, pp. 1-23, Schlumberger, U.S.A.

StageFRAC Maximize Reservoir Drainage, 2007, pp. 1-2, Schlumberger, U.S.A.

International Search Report and Written Opinion; Date of Mailing Aug. 29, 2011; International Application No. PCT/US2011/022523; International Filing Date Jan. 26, 2011; Korean Intellectual Property Office; International Search Report 5 pages; Written Opinion 3 pages.

International Search Report; PCT/US2010/044399; International Searching Authority KIPO; Mailed Mar. 21, 2011.

Notification of Transmittal of the International Search Report and the Written Opinion of the International Searching Authority; PCT/US2010/054487; International Searching Authority; KIPO; Mailed Jun. 3, 2011.

Notification of Transmittal of the International Search Report and the Written Opinion of the International Searching Authority; PCT/US2010/049810; International Searching Authority KIPO; Mailed Apr. 25, 2011.

Notification of Transmittal of the International Search Report and the Written Opinion of the International Searching Authority; PCT/US2011/041663; Korean Intellectual Property Office; Mailed Dec. 14, 2011; 8 pages.

* cited by examiner

US 8,272,445 B2

TUBULAR VALVE SYSTEM AND METHOD

BACKGROUND

Several industries, such as the downhole drilling and completion industry, for example, use tubular valve systems to open a plurality of ports through a tubular along a longitudinal extent of the tubular. Selectively opening such ports typically involves running a shifting tool within the tubular to each valve receptive to the tool, engaging the valve with the shifting tool, and shifting the valve to the desired position before withdrawing the shifting tool from the tubular. Such a method, though effective, causes downtime of the operation during the running, shifting and withdrawal of the shifting tool. Systems and methods that reduce such downtime would be well received in the art.

BRIEF DESCRIPTION

A tubular valve system including a tubular having a plurality of ports therethrough; a plurality of strokable sleeves disposed at the tubular being configured to stroke in response to a same external input; and a plurality of motion translating details disposed at at least one of the tubular and the plurality of strokable sleeves configured to alter a stroke of the plurality of strokable sleeves after a selected number of strokes to thereby open at least one of the plurality of ports.

A method of selectively opening a plurality of ports in a tubular, including positioning a plurality of sleeves along a tubular; occluding a plurality of ports in the tubular with the plurality of sleeves; stroking the plurality of sleeves with a same external input; opening at least one of the plurality of ports after stroking the plurality of sleeves a first number of strokes; and opening at least one other of the plurality of ports after stroking the plurality of sleeves a second number of strokes.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
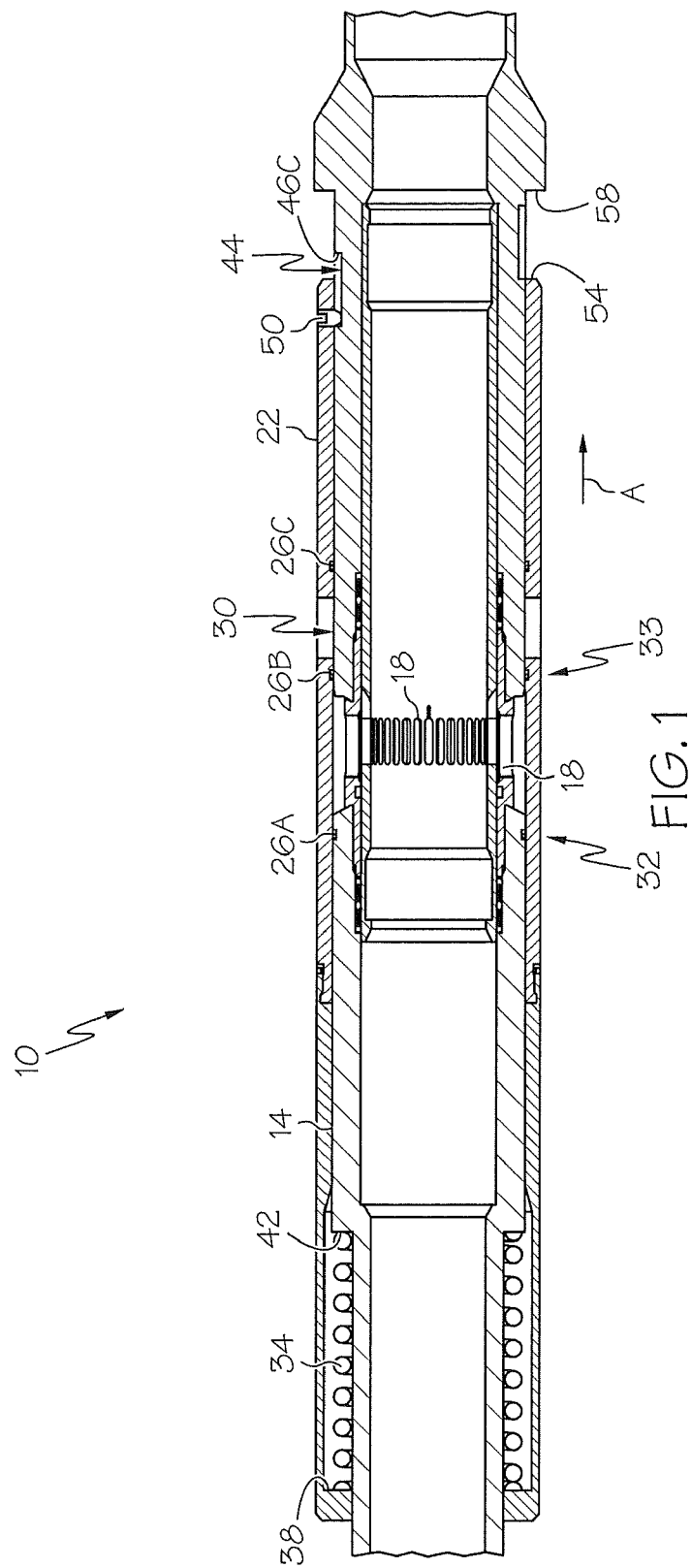
FIG. 1 depicts a cross sectional view of a tubular valve system disclosed herein in a low-pressure ports closed position.

Referring to FIG. 1, a tubular valve system 10 disclosed herein is illustrated in cross section. The valve system 10 includes, a tubular 14, having a plurality of ports 18, and a plurality of sleeves 22, with just one sleeve 22 being illustrated in FIG. 1. Additional ports 18 and sleeves 22 being disposed longitudinally in either or both directions along the tubular 14. The sleeves 22 are longitudinally strokable relative to the tubular 14 a selectable number of times, in response to an external input, before the sleeves 22 stroke to a position thereby opening the ports 18.

Three seals 26A, 26B, 26C, disclosed in this embodiment as o-rings, sealingly slidably engage the sleeve 22 to an outer surface 30 of the tubular 14. The outer surface 30 presents a larger dimension portion 32 (diametrical in this embodiment) to the seal 26B than a smaller dimension portion 33 that it presents to the seal 26A. As such, the larger area formed between the seal 26B and the larger dimension portion 32 in comparison to the smaller area formed between the seal 26A and the smaller dimension portion 33 creates a biasing force toward the seal 26B, in the direction of arrow 'A.' The biasing force created is proportional to increases in pressure within the tubular 14 since such pressure acts simultaneously on both sealed areas. A biasing member 34, depicted as a compression spring herein, loaded between a shoulder 38 on the sleeve 22 and a shoulder 42 on the tubular 14, biases the sleeve 22 in a direction opposite to that of arrow 'A.' The foregoing construction allows an operator to stroke the sleeve 22 in the direction of arrow 'A' by increasing pressure within the tubular 14 to a level adequate to overcome the urging of the biasing member 34 as well as any friction and gravitational loads depending upon the orientation of the system 10. The operator may also stroke the sleeve 22 in a direction opposite to the arrow 'A' by decreasing pressure within the tubular 14 and allowing the urging of the biasing member 34 to move the sleeve 22.

Figure 2:
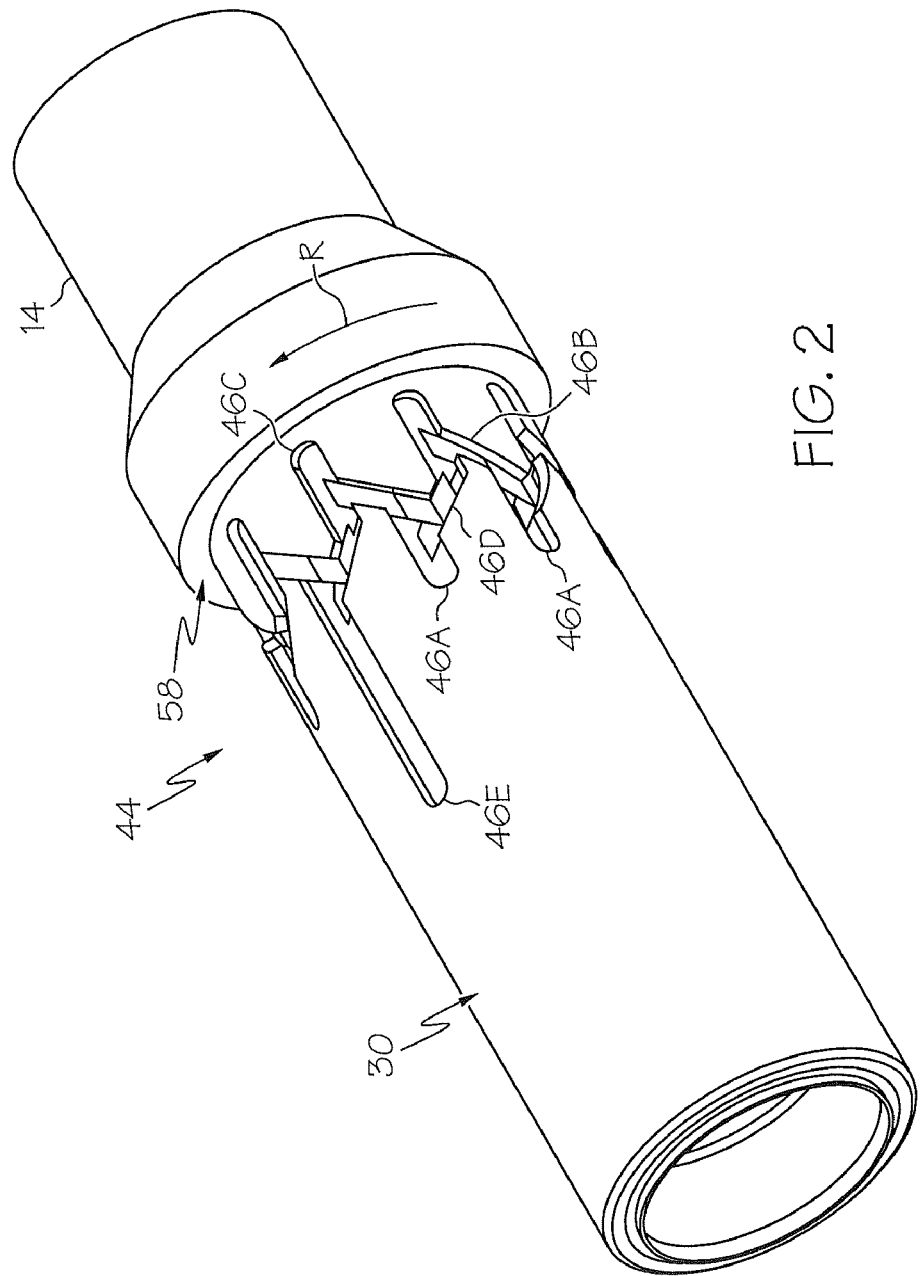
FIG. 2, depicts a perspective view of a portion of a tubular shown in the tubular valve system of FIG. 1.

Referring to FIG. 2, a series of motion translating details 44, illustrated herein as J-slots, formed in the outer surface 30 limits the lengths of longitudinal strokes of the sleeve 22 in relation to the tubular 14. A pin 50 (FIG. 1) fixedly attached to the sleeve 22 protrudes into the J-slot 44. As the sleeve 22 moves longitudinally relative to the tubular 14 the pin 50 slidably engages walls 46 of the J-slot 44. Walls 46A and 46E limit the longitudinal travel of the sleeve 22 in the direction opposite to the arrow 'A' while the walls 46C limit the longitudinal travel of the sleeve 22 in the direction of arrow 'A.' Alternate embodiments can limit the longitudinal travel of the sleeve 22 in the direction of arrow 'A' by abutting an end surface 54 of the sleeve 22 against a shoulder 58 of the tubular 14. Such a configuration can prevent over loading of the pin 50 that could result from an excessive pressure condition. Walls 46B when contacted by the pin 50, when the sleeve 22 is stroked in the direction of arrow 'A,' causes relative rotation of the sleeve 22 to the tubular 14 in a direction of arrow 'R.' Similarly, walls 46D when contacted by the pin 50 when the sleeve 22 is stroked in the direction opposite to arrow 'A' causes relative rotation of the sleeve 22 to the tubular 14 also in the direction of arrow 'R.'

Figure 3:
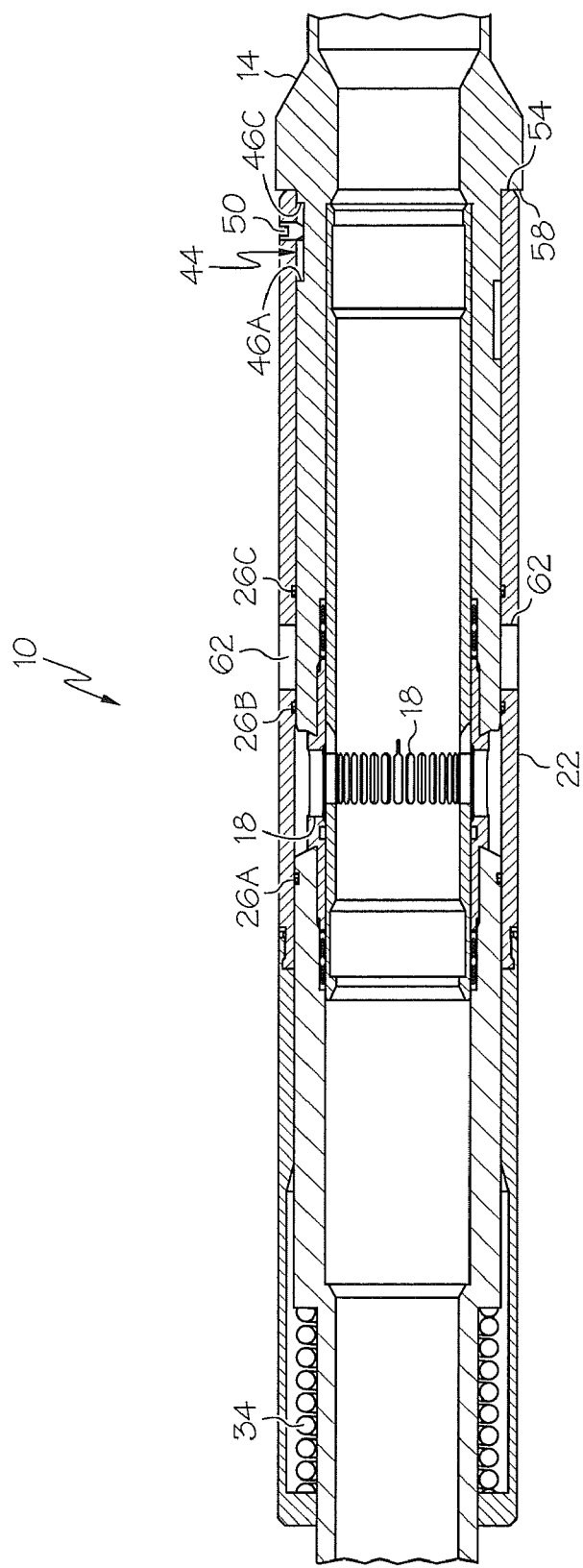
FIG. 3, depicts a cross sectional view of the tubular valve system of FIG. 1 in a high-pressure ports closed position.

Referring to FIG. 3, the tubular valve system 10 is illustrated in a high-pressure stroke position. In this embodiment, the end surface 54 is abutting the shoulder 58 thereby limiting the stroke without the pin 50 contacting the walls 46C. In contrast, referring again to FIG. 1, the valve system 10 is illustrated in a low-pressure stroke position. In this position, the urging force of the biasing member 34 has moved the sleeve 22 in the direction opposite to arrow 'A' causing contact of the pin 50 with the wall 46A of the J-slots 44. In both of these high-pressure and low-pressure positions the sleeve 22 occludes the ports 18. This is evidenced by the seals 26A and 26B that are sealed to the outer surface 30 on either side of the ports 18, thereby providing no open flow passageway.

Figure 4:
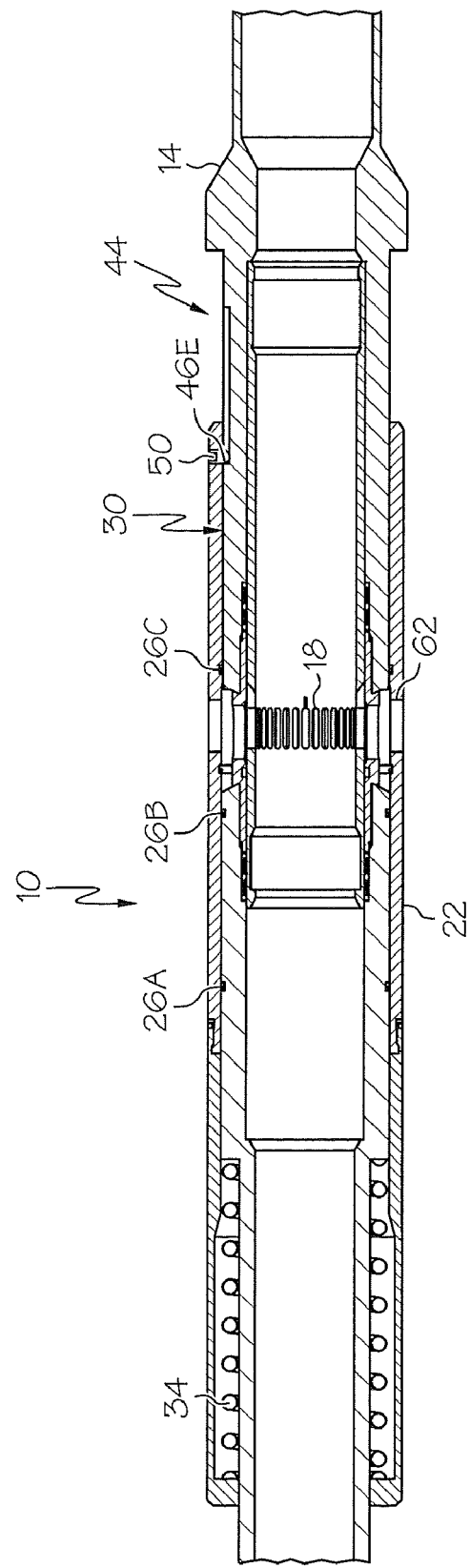
FIG. 4 depicts a cross sectional view of the tubular valve system of FIG. 1 in a low-pressure ports open position.

Referring to FIG. 4, the valve system 10 is illustrated in a position wherein the ports 18 are open since fluid is free to pass through the ports 18 and through ports 62 in the sleeve 22 to outside of the sleeve 22. Seals 26B and 26C, located on either side of the ports 62, straddle the ports 18 preventing fluid from flowing between the sleeve 22 and the outer surface 30. Longitudinal alignment of the ports 62 with the ports 18 is possible by the longitudinal location of the wall 46E of the J-slots 44, which permits the sleeve 22 to move much further in the direction opposite to the arrow 'A' than the walls 46A permitted. Locating the pin 50 in the J-slot 44 aligned with the wall 46E occurs after a selected number of strokes of the sleeve 22 relative to the tubular 14 since, as described above, each longitudinal stroke causes a corresponding rotational movement of the sleeve 22 relative to the tubular 14. Thus, the J-slot 44 acts as a stroke counter and an operator, by setting the rotational position of the sleeve 22 (and the pin 50) can select how many pressure up-pressure down cycles (strokes) will be required before the pin 50 is aligned with the wall 46E portion of the J-slot 44 thereby allowing opening of the ports 18.

Further, since the tubular valve system 10 has a plurality of sleeves 22 positioned longitudinally along the tubular 14, each of the plurality of sleeves 22 can be selectively set to open at a determined number of strokes. The valve system 10 thereby provides an operator with a significant amount of valve control without requiring intervention such as running a shifting tool to each valve in order to actuate the valve. Additionally, the J-slot 44 can be configured to allow closure of the ports 18 through an additional number of strokes by causing additional rotation of the sleeve 22 to a position wherein the pin 50 again engages one of the walls 46A of the J-slot 44, for example.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A tubular valve system comprising:
a tubular having a plurality of ports therethrough;
a plurality of strokable sleeves disposed along the tubular directly occluding a plurality of the plurality of ports and being configured to stroke in response to a same external input; and
a counter configured to count the strokes of at least one of the plurality of strokable sleeves and further configured to alter a longitudinal stroke of the at least one of the plurality of strokable sleeves after a selected number of longitudinal strokes to thereby open at least one of the plurality of ports.

2. The tubular valve system of claim 1, wherein the same external input is changes in pressure.

3. The tubular valve system of claim 2, wherein the plurality of strokable sleeves stroke in a first direction in response to a pressure increase and stroke in a second direction in response to a pressure decrease.

4. The tubular valve system of claim 3, wherein a shoulder serves as a stop to the sleeve when moved in at least one of the first direction and the second direction.

5. The tubular valve system of claim 3, further comprising a plurality of biasing members configured to urge the plurality of strokable sleeves in the second direction.

6. The tubular valve system of claim 5, wherein the plurality of biasing members are capable of stroking the plurality of strokable sleeves in the second direction.

7. The tubular valve system of claim 5, wherein the first direction is longitudinally opposite to the second direction.

8. The tubular valve system of claim 1, wherein the counter is configured to rotate the plurality of strokable sleeves in relation to the tubular in response to the sleeve being stroked.

9. The tubular valve system of claim 8, wherein the counter includes at least one J-slot.

10. The tubular valve system of claim 8, wherein travel dimensions of the strokes are defined by the counter.

11. The tubular valve system of claim 8, wherein the selectable number of strokes is defined by the counter.

12. The tubular valve system of claim 1, wherein the selectable number of strokes is defined by rotational position of the plurality of strokable sleeves in relation to the tubular prior to stroking.

13. The tubular valve system of claim 1, wherein the plurality of strokable sleeves are disposed longitudinally along the tubular.

14. The tubular valve system of claim 1, wherein at least one of the plurality of strokable sleeves is selected to open at a different number of strokes than at least one other of the plurality of strokable sleeves.

15. The tubular valve system of claim 1, wherein at least one of the plurality of strokable sleeves is configured to occlude at least one of the plurality of ports at a selectable number of additional strokes after the at least one of the plurality of strokable sleeves opened the at least one of the plurality of ports.

16. A method of selectively opening a plurality of ports in a tubular, comprising:
positioning a plurality of sleeves along a tubular;
occluding a plurality of ports in the tubular with the plurality of sleeves;
stroking the plurality of sleeves with a same external input more than once;
counting the number of strokes;
opening at least one of the plurality of ports after counting a selected first number of strokes; and
opening at least one other of the plurality of ports after counting a selected second number of strokes.

17. The method of selectively opening the plurality of ports in the tubular of claim 16, further comprising pressuring up the tubular to stroke the plurality of sleeves.

18. The method of selectively opening the plurality of ports in the tubular of claim 16, further comprising biasing the plurality of sleeves.

19. The method of selectively opening the plurality of ports in the tubular of claim 18, further comprising stroking the plurality of sleeves with the biasing.

20. The method of selectively opening the plurality of ports in the in the tubular of claim 16, further comprising rotating the plurality of sleeves in relation to the tubular in response to the stroking.

21. The method of selectively opening the plurality of ports in the tubular of claim 16, further comprising the counting includes advancing a pin within a J-slot.

22. The method of selectively opening the plurality of ports in the tubular of claim 16, further comprising selecting a number of strokes needed to be counted to open the at least one of the plurality of ports.

23. The method of selectively opening the plurality of ports in the tubular of claim 22, wherein the selecting is accomplished by rotationally positioning the plurality of sleeves relative to the tubular.

24. The method of selectively opening the plurality of ports in the tubular of claim 16, further comprising fracturing an earth formation with hydraulic pressure after the opening of the at least one of the plurality of ports.

* * * * *